(No Model.)
J. BROWN & M. G. ALCORN.
FRUIT PICKER.
No. 312,326. Patented Feb. 17, 1885.
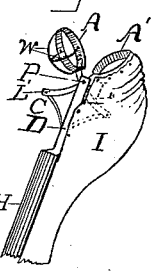
Fig. 1.
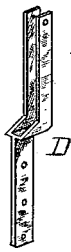
Fig. 6.
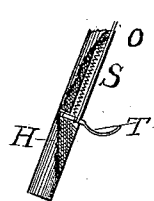
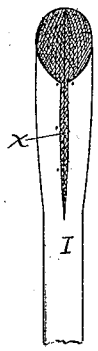
Fig. 2.
Fig. 3.
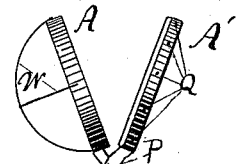
Fig. 4.
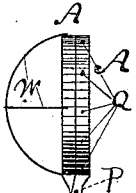
Fig. 5.
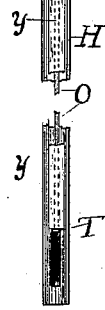
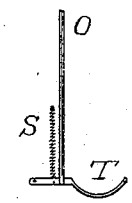
Witnesses.
T. O. Pendleton
O. W. ...
Inventors.
James Brown
and Marshall G. Alcorn
per Hazard & Townsend
their Attys.

UNITED STATES PATENT OFFICE.

JAMES BROWN AND MARSHALL G. ALCORN, OF LOS ANGELES, CALIFORNIA.

FRUIT-PICKER.

SPECIFICATION forming part of Letters Patent No. 312,326, dated February 17, 1885.

Application filed July 31, 1884. (No model.)

*To all whom it may concern:*

Be it known that we, JAMES BROWN and MARSHALL G. ALCORN, citizens of the United States, residing at Los Angeles, in the county of Los Angeles and State of California, have invented a new and useful Improvement in Fruit-Pickers, of which the following is a specification.

Our invention relates to pickers adapted to remove from the trees fruit liable to be injured by bruising or by pulling out the stem, and the object of our invention is to devise a simple, compact, and convenient instrument for accomplishing this. We do this by means of the device described herein and illustrated in the accompanying drawings, in which—

Figure 1 is a perspective view of our device, a section of the handle being cut away. Fig. 2 is a view of the upper end of the hose, showing the slit $x$. Fig. 3 is a face view, and Figs. 4 and 5 side views, the handle H not being shown in Figs. 4 and 5. Fig. 6 is a view of the standard D.

A A' are two circular jaws mounted on arms L L', which are pivoted in a common standard or support, D, by a single pivot, P. The edges of the jaws which meet are sharpened to a keen edge, and one is of a smaller diameter than the other, so as to closely fit within it. The levers L L' have an outward and downward curve. Connecting-rods C C' are attached to the outer ends of the levers L L', and connect them with the operating-rod O, which extends downward along a groove in the handle H nearly to its lower extremity, where it is attached to the trigger T, mounted in a mortise in the handle. A spring, S, is fastened in the handle H at its upper end, and to the trigger by its lower end, being inclosed in an enlargement of the groove in which the rod O operates. The tendency of this spring is to elevate the trigger and connecting-rod, and thus hold the jaws A A' open. A canvas hose, I, is fitted around and attached to the jaw A' by fastenings passing through the perforations Q Q. It extends downward along the standard D and handle H, and is attached thereto at intervals. A longitudinal slit, $x$, is provided in the hose for the reception of the lever L, so that the hose may be made to fit closely against the standard without interfering with the operation of the lever which projects from that side of the standard. Two wires, W W, are bent to form semicircles, and are attached to the jaw A to prevent the fruit from falling away from the hose in case the hose should be on the upper side when the fruit is detached.

The operation of the picker is as follows: The hose is connected to a pouch attached to the operator to receive the fruit as it is picked. The operator then grasps the handle H, using one hand to control the trigger L. When the jaws are near the fruit, the trigger is released. The tension of the spring draws it upward, thus elevating the operating-rod and the connecting-rods C C', which, acting upon the levers L L', expand the toggle-joints formed by the levers and rods, and thus open the jaws $a\ a'$, which are then held so as to inclose the fruit. The trigger is then depressed, thus drawing the rod downward and closing the jaws, the edges of which come into contact with the stem of the fruit and clip it, allowing it to fall into the hose. As the jaws are circular and the entire edge of each is sharp, there is no difficulty in bringing them into contact with the stem at the proper place, and as each jaw advances toward the other when being closed, they will usually both come into contact with the stem at the same time, as the fruit will ordinarily be midway between the jaws when they are advanced to pluck it. Thus it will be seen that, by making both jaws movable, the liability of pulling the stem out of the fruit is avoided. As the operating-rod is rigid, there is no danger that the jaws will stick together, for, if the spring should not be strong enough to open them, the operator may throw the trigger up by hand, thus forcing the jaws open. The operating-rod is let into a groove in the handle, so as to be out of the way, and is covered with a strip of tin, so that the handle is smooth. The outward curve of the levers L L' prevents their coming together when the jaws are closed, whereby greater force is exerted than could be were the levers in line with the jaws. The standard D has a bend at the point where it unites with the staff or handle, so as to bring its center in line with the operating-rod.

Now, having described our invention, what we claim as new, and desire to secure by Letters Patent, is—

1. The combination, in a fruit-picker, of two circular blades, A A', provided with cutting-edges, two levers, L L', attached to such blades, and pivoted to each other and to a handle, as shown, the connecting-rods C C', operating-rod O, trigger T, and the hose I, attached to one of the blades and to the handle of the picker, and having a slit, x, to admit the lever L, substantially as set forth.

2. In a fruit-picker, the combination, with the jaws and operating mechanism, substantially as described, of a hose for conducting the fruit from the jaws to the ground, having an opening or slit therein to admit the lever which operates one of the jaws, whereby the hose is adapted to be closely attached to the handle of the picker.

JAS. BROWN.
MARSHALL G. ALCORN.

Witnesses:
H. T. HAZARD,
JAS. R. TOWNSEND.